United States Patent [19]

Sydansk

[11] 4,280,560

[45] Jul. 28, 1981

[54] POTASSIUM HYDROXIDE CLAY STABILIZATION PROCESS

[75] Inventor: R. D. Sydansk, Littleton, Colo.

[73] Assignee: Marathon Oil Company, Findlay, Ohio

[21] Appl. No.: 164,621

[22] Filed: Jun. 30, 1980

[51] Int. Cl.$^3$ ............................................. E21B 43/22
[52] U.S. Cl. .......................... 166/305 R; 252/8.55 R
[58] Field of Search ............... 166/252, 273, 274, 275, 166/291, 292, 293, 301, 305 R, 307; 405/263

[56] References Cited

U.S. PATENT DOCUMENTS

| | | | |
|---|---|---|---|
| 1,635,500 | 7/1927 | Potts | 166/292 X |
| 2,607,428 | 8/1952 | Bond et al. | 166/292 |
| 2,699,213 | 1/1955 | Cardwell et al. | 166/292 X |
| 3,103,973 | 9/1963 | Mullen | 166/292 X |
| 3,306,355 | 2/1967 | Maly | 166/292 |
| 3,372,748 | 3/1968 | Cook | 166/273 X |
| 3,414,053 | 12/1968 | Treiber et al. | 166/273 |
| 3,603,399 | 9/1971 | Reed | 166/305 R |
| 3,640,343 | 2/1972 | Darley | 166/292 |
| 3,777,817 | 12/1973 | Henderson | 166/307 |

FOREIGN PATENT DOCUMENTS 562639  8/1977  U.S.S.R. ................................... 166/307

OTHER PUBLICATIONS

Cooke, Jr., et al., "Oil Recovery by Alkaline Waterflooding", *Journal of Petroleum Technology*, Dec. 1974, pp. 1365–1374.

*Primary Examiner*—Stephen J. Novosad
*Assistant Examiner*—George A. Suchfield
*Attorney, Agent, or Firm*—Jack L. Hummel

[57] ABSTRACT

An aqueous solution having potassium hydroxide dissolved therein is injected into a subterranean sandstone formation containing water-sensitive fine particles, including clays. Potassium hydroxide stabilizes the fine particles for a substantial period of time thereby substantially preventing formation permeability damage caused by encroachment of aqueous solutions having a distinct ionic makeup into the treated formation.

14 Claims, No Drawings

POTASSIUM HYDROXIDE CLAY STABILIZATION PROCESS

DESCRIPTION

1. Technical Field

The invention relates to a process for stabilizing clays present in a water-sensitive, subterranean sandstone formation, and more particularly, to a process for stabilizing clays present in the environment near a well bore penetrating a water-sensitive, subterranean hydrocarbon-bearing sandstone formation for a substantial period of time.

2. Background Art

Encroachment of aqueous solutions having a distinct ionic makeup from connate water into subterranean sandstone formations containing clays often result in reduced fluid flow, and therefore, reduced oil production. Encroachment of ionically distinct fluid in a subterranean sandstone formation can occur in a variety of ways, such as, invasion by an underlying aquifer, invasion of a secondary or tertiary oil recovery flood, and invasion of treatment fluids utilized in the near well bore environment. Two distinct types of clay damage can result from encroachment of aqueous solutions having distinct ionic makeup. First, swellable clays, such as montmorillonite, have interstitial layers. Fresh water contact affects the ionic properties between these interstitial layers and swells these clays thereby impeding fluid flow therethrough. Secondly, migratable clays, such as poorly cemented kaolinite and illite clay particles, become detached from the subterranean sandstone formation during flow of fresh water therethrough. The resultant mobile clay particles can become trapped in the formation pore-throat openings, and thus, reduce permeability and fluid flow therethrough. The second type of permeability reduction is referred to as clay particle migration. Often, encroachment of aqueous solutions having a distinct ionic makeup, such as, fresh water, into a subterranean sandstone formation containing clays results in the occurrence of both types of permeability damage.

Several prior art processes have been proposed to stabilize clays present in subterranean formations, and therefore, alleviate fresh water damage thereto. U.S. Pat. No. 3,640,343 to Darley discloses a method for stabilizing hard shaly earth formations (i.e., migratable clays) during drilling or fluid production by injecting into the hard shaly earth formation a dilute aqueous solution of alkali metal silicate containing SiO$_2$ in an amount from about 2 to about 6 percent by weight and having a viscosity of less than 2 centipoise and a pH of from about 11 to about 12. It has been proposed to inject an aqueous solution of potassium chloride into a subterranean sandstone formation to stabilize clays. However, potassium chloride will stabilize clays only when the connate brine in contact with the clay has a high potassium-to-sodium ion ratio. Thus, clay stabilization resulting from treatment with potassium chloride has proven only temporary in that most formation and injection waters have high sodium-to-potassium ion ratios, and as such, potassium ions are rapidly exchanged from the clays resulting in the loss of any clay stabilization attributable to the potassium ions. Polyvalent cations containing solutions and other proposed clay-stabilization treatment fluids include a solution containing water soluble organic polymers, a hydroxy-aluminum acidic solution, such as set forth in U.S. Pat. No. 3,603,399 to Reed, a calcium hydroxide solution, such as set forth in U.S. Pat. No. 4,031,959 to Henderson, and a dissolved zirconium salt solution. Utilizing sodium hydroxide to stabilize clays has proven relatively ineffective in that sodium hydroxide can promote significant formation permeability damage, and in some instances, actually increases the fresh water sensitivity of formation clays. The remaining treatment solutions, most of which do not contain hydroxide ions, have resulted in varying effectiveness, are relatively expensive to utilize, or result in adverse in situ side effects, such as, permeability reduction. Thus, a need exists for a process for stabilizing clays in a subterranean sandstone formation which not only effectively prevents fresh water permeability damage to subterranean formation containing clays, but also permanently stabilizes such clays.

DISCLOSURE OF INVENTION

The present invention provides a process for stabilizing water-sensitive fine particles, including clays, present in a subterranean sandstone formation for a substantial period of time. An aqueous solution having potassium hydroxide dissolved therein is injected into the sandstone formation. The potassium hydroxide stabilizes the fine particles for a substantial period of time thereby effectively reducing formation permeability damage caused by encroachment of aqueous solutions having a distinct ionic makeup into the formation. Potassium hydroxide concentration and/or the period of time over which potassium hydroxide is injected into the formation can be increased at relatively low formation temperatures to ensure effectiveness of the process.

BEST MODE FOR CARRYING OUT THE INVENTION

The present invention relates to a process for stabilizing clays present in a water-sensitive, subterranean sandstone formation for a substantial period of time. As utilized throughout this description, the term "clay stabilization" refers to treating a sandstone formation in such a manner as to substantially prevent permeability damage and fluid flow reduction caused by any variation in salt (ionic) makeup of injection and produced waters. Reduced fluid flow results from negative interaction between an aqueous solution having a distinct ionic makeup, such as, fresh water, and fine particles, including clays. Fine particles which are involved in fresh water permeability damage include all swelling and potentially mobile fine particles present within sandstone pore bodies. Fine particles are those particles which have diameters less than 37 micrometers. Examples of fine particles which can contribute to permeability damage are clays, high surface area silica, minerals, mica, feldspars, and barite. As utilized throughout this description, the term "clays" encompasses both swelling clays, such as, montmorillonite, vermiculite, swelling chlorite, and mixed layered swelling clays and migratable clays, such as, poorly cemented kaolinite and illite clay particles. "Mixed layered swelling clays" is inclusive of layered mixtures of swelling and non swelling clays which will swell when contacted with fresh water. The term "fresh water" refers to an aqueous solution which has a relatively low concentration of dissolved salts, including monovalent ions.

The process of the present invention comprises the continuous, relatively slow injection of an aqueous solution containing potassium hydroxide dissolved therein into a water-sensitive, subterranean sandstone formation. The injected potassium hydroxide solution effectively stabilizes clays thereby substantially preventing fresh water permeability damage and reduced oil production. It has been discovered that the hydroxide ion interaction with formation clays in the presence of potassium ions unexpectedly results in clay stabilization for a substantial period of time. While it is not completely understood exactly why such stabilization results, it is believed that the hydroxide ion-sandstone interaction in the presence of potassium ions retains the beneficial potassium ion stabilization affect on clays by one of the following two mechanisms, both of which include clay dissolution to some degree. First, a fine, potassium aluminosilicate mineral (possibly a potassium zeolite) is precipitated over the clays in the subterranean sandstone formation. This potassium-aluminosilicate precipitate prevents fresh water from contacting the clays and also cements migratable clay particles to pore walls of the formation. Secondly, the irreversible hydroxide ion sandstone interaction partially dissolves formation clays resulting in the breaking of silicon-oxygen bonds which subsequently reform in a more stable manner. The stable rearrangement results in migratable clay particles being chemically bonded to the sandstone formation pore walls and the interstitial layers of swelling clays, being chemically bonded together.

The process of the present invention is applicable to a wide range of subterranean sandstone formation temperatures and also to a wide range of subterranean sandstone formation mineralogies. The process of the present invention can be applied to subterranean sandstone formations having a temperature of about 22° C. up to about 85° C. and above. Injection of a potassium hydroxide solution in accordance with the present invention should be preferably conducted with a finite solution flow rate as static treatment may result in minor formation permeability damage. Any frontal advance rate greater than about 0.03 m/day will effectively prevent treatment permeability damage. Although significantly larger frontal advance rates can be utilized, such rates usually provide little additional benefits. Excessively large flow rates should be avoided due to high chemical cost.

Preferably, the potassium hydroxide solution of the present invention is injected into the near well bore environment of a subterranean sandstone formation. As utilized throughout this description, the term "near well bore" denotes the area of a subterranean sandstone formation surrounding a well bore penetrating same which exhibits relatively homogeneous horizontal characteristics. As a general guide, the near well bore environment usually extends a radial distance into the formation of up to about 3 meters from the well bore and any extend up to about 9 meters or more. As the greatest fluid pressure drop, fluid velocity and quantity of fluid transported occurs in the near well bore environment of a subterranean formation, the near well bore environment is the area of a subterranean formation most susceptible to clay damage. Additionally, permeability damage in the near well bore environment has the greatest effect on fluid injection and production. While the process of the present invention is not inherently limited to the near well bore environment, far well bore applications are relatively expensive and of decreased value since clay stabilization problems are less acute in the far well bore region.

As the effectiveness of process of the present invention is at least partially controlled by the kinetics of the hydroxide ion-sandstone interaction, the effectiveness is dependent on several kinetic parameters. Treatment effectiveness is dependent upon potassium hydroxide concentration. The concentration of potassium hydroxide utilized in the aqueous solution can range from about 1 wt.% up to the solubility of potassium hydroxide in solution. The concentration of potassium hydroxide utilized in the aqueous solution preferably can range from about 5 wt.% to about 30 wt.%, and more preferably is about 15 wt.% to about 25 wt.%. Treatment effectiveness is also dependent upon the treatment time employed. Treatment time can range from a lower limit which is dictated by the kinetics of the hydroxide ion-sandstone interaction to an upper limit which is dictated by the economics involved in unrealized hydrocarbon production due to shutting in a well bore during treatment. Treatment time is preferably from about 1 hour to about 48 hours, and more preferably, is about 24 hours. The sandstone formation temperature has a bearing on treatment effectiveness, and in part, dictates the potassium hydroxide solution concentration and/or the treatment time. Thus, although the process of the present invention can be utilized to stabilize clays for a substantial period of time over a wide range of formation temperatures, at relatively low formation temperatures, for example, from about 22° C. to about 45° C., potassium hydroxide concentration or treatment time must be increased to maintain the effectiveness of the treatment which occurs at higher formation temperatures. At such low formation temperatures, potassium hydroxide concentration is the preferred parameter to increase. In general, a variance in formation temperature will vary the preferred potassium hydroxide concentration and treatment time.

The following examples are illustrative of the application of the process of the present invention to stabilize clays in a water-sensitive, subterranean sandstone formation and are not to be construed as limiting the scope thereof. Three distinct indicia are utilized throughout the following examples to evaluate the effectiveness of clay stabilization treatments. All three indicia utilize the ratio $k_{final}/k_{initial}$ ($k_f/k_i$) which is the ratio of the final fluid permeability measured after a given operation to the initial fluid permeability measured prior to application of any operation. The first indicia is the ratio $(k_f/k_i)_t$ which is the ratio of fluid permeability of a subterranean sandstone formation core measured after application of a given treatment to the fluid permeability of the core measured prior to treatment application. This ratio indicates the permeability damage which is attributable to the treatment. Such damage may result from, for example, in situ precipitation of constituents of a treatment fluid. An ideal treatment should result in $(k_f/k_i)_t$ equalling 1.0. The second indicia is the ratio $(k_f/k_i)_{cs}$ which is the ratio of the fluid permeability of a subterranean sandstone formation core measured after application of a given clay stabilization treatment, and subsequent 3.0 wt.% NaCl and fresh water floods to the fluid permeability of the core measured prior to application of any operation. The fresh water floods utilized in the examples consist of distilled water floods and, unless noted to the contrary, consist of ten pore volumes of distilled water flooded at a frontal advance rate of approximately 30 m/day. The ratio $(k_f/k_i)_{cs}$ indicates the susceptibility of the plug to permeability damage due to encroachment of an aqueous solution having a distinct ionic makeup after application of a clay stabilization treatment. An effective clay stabilization treatment should result in a $(k_f/k_i)_{cs}$ ratio which approximates $(k_f/k_i)_t$. The third indicia is the ratio $(k_f/k_i)_c$ which is the ratio of the fluid permeability of a comparable untreated subterranean sandstone formation core measured after a fresh water flood to the fluid permeability of the core measured prior to application of any operation. The ratio $(k_f/k_i)_c$ indicates susceptibility (or sensitivity) of the plug to permeability damage due to fresh water encroachment with the plug has not been previously treated in an attempt to stabilize clays. The fluid utilized to measure fluid permeability of the core before or after any operation may be crude oil or brine. Two distinct fluids can be utilized to measure the fluid permeability of one core.

To evaluate the effectiveness of a clay stabilization treatment, the $(k_f/k_i)_{cs}$ ratio must be evaluated with respect to the $(k_f/k_i)_c$ ratio. Thus, when a subterranean sandstone formation plug is relatively sensitive to permeability damage due to fresh water, i.e. a relatively low $(k_f/k_i)_c$ ratio, for example, 0.01, a moderate $(k_f/k_i)_{cs}$ ratio, for example, 0.5, would indicate an effective treatment. However, when a plug is relatively insensitive to permeability damage due to fresh water, for example, a $(k_f/k_i)_c$ ratio is 0.4, the moderate $(k_f/k_i)_{cs}$ ratio of 0.5 would indicate a relatively ineffective clay stabilization treatment. As a general guide, divergent $(k_f/k_i)_{cs}$ and $(k_f/k_i)_c$ ratios coupled with a $(k_f/k_i)_{cs}$ ratio approaching $(k_f/k_i)_t$ indicate an effective clay stabilization treatment. However, an otherwise effective treatment can actually be relatively ineffective if application of the treatment results in a high degree of formation permeability damage, i.e., a relatively low $(k_f/k_i)_t$ ratio.

Unless otherwise noted, the floods performed in the following examples are conducted at atmospheric pressure and are conducted in plugs previously flooded with brine solutions only. The presence of only brine within the plug renders the plug more susceptible to damage due to encroachment of aqueous solutions having a distinct ionic makeup. In each of the examples, comparable sandstone formation plugs are flooded to determine the $(k_f/k_i)_c$ ratio at comparable conditions, i.e., temperature, volume injected, and frontal advance rate of distilled water.

EXAMPLE 1

A linear, unfired, homogeneous Berea standstone plug having an initial permeability of 260 md is injected with 17 pore volume of a 15 wt.% KOH treatment solution for 24 hours at a frontal advance rate of 0.6 m/day. The injected fluids and plug are maintained at 85° C. by a heat exchanger. The resulting $(k_f/k_i)_t$ ratio is 1.20 and the $(k_f/k_i)_{cs}$ ratio is 1.03. The $(k_f/k_i)_c$ ratio is determined on a comparable core to be less than 0.01.

EXAMPLE 2

A homogeneous sandstone plug from an Oligocene aged reservoir is injected with 26 pore volumes of a 10.0 wt.% KOH treatment solution for 24 hours at a frontal advance rate of 0.7 m/day. The injected fluids and plugs are maintained at 700 psig back pressure and 85° C. by a heat exchanger. The results for both crude oil and brine permeability are set forth in Table 1.

TABLE 1

| Measurement Fluid | $(k_f/k_i)_t$ | $(k_f/k_i)_{cs}$ | $(k_f/k_i)_c$ |
|---|---|---|---|
| Crude | .80 | .74 | .066 |
| Brine | .81 | .75 | .064 |

The treatment aforedescribed was repeated in core plugs from the same reservoir utilizing a 15.0 wt.% KOH treatment solution. The results are set forth in Table 2.

TABLE 2

| Measurement Fluid | $(k_f/k_i)_t$ | $(k_f/k_i)_{cs}$ | $(k_f/k_i)_c$ |
|---|---|---|---|
| Crude | 1.05 | .91 | .20 |
| Brine | .95 | .90 | .20 |

This example indicates that clays present in an extremely water-sensitive, subterranean sandstone formation can be effectively stabilized by treatment with an aqueous solution containing KOH without significant damage to formation permeability.

EXAMPLE 3

Comparable, linear, unfired, homogeneous Berea sandstone plugs are each treated with an aqueous solution having KOH dissolved therein. The injected fluids and plugs are maintained at the temperature hereinafter indicated by a heat exchanger. The results are set forth in Table 3.

TABLE 3

| Treatment Parameters | #1 | #2 | #3 | #4 |
|---|---|---|---|---|
| Temperature | 85° C. | 65° C. | 45° C. | 22° C. |
| Pore Volumes KOH Injected | 17 | 16 | 8.2 | 22 |
| Wt % KOH | 15.0 | 15.0 | 30.0 | 30.0 |
| Treatment Time (Days) | 1.0 | 1.0 | 4.0 | 1.0 |
| Flow Rate (m/day) | 0.6 | 0.58 | 0.08 | 0.6 |
| Results | | | | |
| $(k_f/k_i)_t$ | 1.20 | 1.09 | .98 | .80 |
| $(k_f/k_i)_{cs}$ | 1.03 | .85 | .97 | .80 |
| $(k_f/k_i)_c$ | <.01 | <.01 | <.01 | <.01 |

As indicated by these results, the process of the present invention can be employed to stabilize clays over a wide range of formation temperatures. The process should effectively stabilize clays at formation temperatures in excess of 85° C. Based on these results and kinetic theory, the treatment should be more effective at temperatures in excess of 85° C., i.e., less KOH and less treatment time are necessary to accomplish a desired result. As the process of the present invention is dependent on the kinetics of hydroxide ion-sandstone interaction, it is important to note that at lower formation temperatures, for example, the temperatures encountered in test nos. 3 and 4, KOH concentration in the treatment solution is preferably increased to achieve effective clay stabilization comparable to that achieved at higher temperatures.

EXAMPLE 4

Three comparable, linear, unfired, homogeneous Berea sandstone plugs having initial permeabilities of approximately 380 md are injected with approximately 8 pore volumes of an aqueous treatment solution having KOH dissolved therein for 24 hours at a frontal advance rate of approximately 0.3 m/day. The KOH concentration of the injected solution is varied for each plug. The injected fluids and plugs are maintained at 85° C. by heat exchangers. The results are set forth in Table 4.

TABLE 4

| KOH Concentration | $(k_f/k_i)_t$ | $(k_f/k_i)_{cs}$ | $(k_f/k_i)_c$ |
|---|---|---|---|
| 15.0 wt. % KOH | 1.04 | .88 | <.02 |
| 10.0 wt. % KOH | 1.02 | .58 | <.02 |
| 5.0 wt. % KOH | 1.12 | .07 | <0.2 |

In addition, two comparable, linear, unfired, homogeneous Berea sandstone plugs having initial permeabilities of approximately 200 md are injected with approximately 20 pore volumes of an aqueous treatment solution having KOH dissolved therein for 24 hours at a frontal advance rate of approximately 0.6 m/day. The injected fluids and plugs are maintained at 22° C. by heat exchangers. The results are set forth in Table 5.

TABLE 5

| KOH Concentration | $(k_f/k_i)_t$ | $(k_f/k_i)_{cs}$ | $(k_f/k_i)_c$ |
|---|---|---|---|
| 30.0 wt. % KOH | .80 | .80 | <.01 |
| 15.0 wt. % KOH | .87 | .02 | <.01 |

As indicated by the results in Tables 4 and 5, the concentration of potassium hydroxide in the injected treatment solution can be increased to assure treatment effectiveness at lower formation temperatures, as previously discussed.

EXAMPLE 5

Two comparable, linear, unfired, homogeneous Berea sandstone plugs having initial permeabilities of approximately 400 md are injected with 10 pore volumes of an aqueous treatment solution having KOH dissolved therein. The injected fluids and plugs are maintained at 85° C. by heat exchangers. Ten pore volumes of 15.0 wt.% KOH solution are injected into one plug for 28 hours at a frontal advance rate of 0.55 m/day and into the other plug for 7 hours at a frontal advance rate of 2.0 m/day. The results are set forth in Table 6.

TABLE 6

| Treatment Time | $(k_f/k_i)_t$ | $(k_f/k_i)_{cs}$ | $(k_f/k_i)_c$ |
|---|---|---|---|
| 28 hours | 1.04 | .92 | .01 |
| 7 hours | 1.20 | .36 | .01 |

As illustrated by this example, treatment time can be increased so as to correspondingly increase the effectiveness of the clay stabilization process of the present invention. As previously discussed, the preferred treatment time will vary with the temperature of the formation to be treated.

EXAMPLE 6

A linear, unfired, homogeneous Berea sandstone plug having an initial permeability of 260 md is sequentially injected as indicated in Table 7. The injected fluids and plug are maintained at 85° C. by a heat exchanger. The results are set forth in Table 7.

TABLE 7

| Treatment Sequence | $(k_f/k_i)$ |
|---|---|
| 21 pore volumes of 15.0 wt. % KOH for 24 hrs @ 0.6 m/day | 1.17 $(k_f/k_i)_t$ |
| 3.0 wt. % NaCl permeability, 8 pore volumes of 3.0 wt. % NaCl, 10 pore volumes of distilled water, 8 pore volumes of 3.0 wt. % NaCl | 0.89 $(k_f/k_i)_{cs}$ |
| 10 pore volumes of 0.30 wt. % NaCl | 1.00 |
| 88 pore volumes of 0.10 wt. % NaCl over 7.0 days, @ 8 and 10 pore volume increments at 23.5 m/day | 1.07 |
| 10 pore volumes of 3.0 wt. % NaCl | 1.09 |
| 10 pore volumes of distilled water, 10 pore volumes of 3.0 wt. % NaCl | 0.80 |
| 3.0 wt. % NaCl permeability, 10 pore volumes of distilled water, 8 pore volumes of 3.0 wt. % NaCl | 0.01 $(k_f/k_i)_c$ |

As illustrated by this treatment, the potassium hydroxide clay stabilization treatment of the present invention is extremely effective as stabilizing clays over a prolonged period of time. The permanent nature of the treatment of the present invention eliminates costs associated with performing subsequent treatments to stabilize clays.

Thus, it can be appreciated that the present invention provides a process for effectively stabilizing clays present in a water-sensitive, subterranean sandstone formation for a substantial period of time. The process can be applied to sandstone formations having varying mineralogies and temperatures by varying treatment, and therefore, kinetic parameters of the hydroxide ion-sandstone interaction to achieve preferred treatment effectiveness.

While the foregoing preferred embodiments of the invention has been described and shown, it is understood that all alternatives and modifications, such as those suggested, and others may be made thereto, and fall within the scope of the invention.

I claim:

1. A process for stabilizing clays present in a water-sensitive, subterranean sandstone formation, the sandstone formation containing fine particles which interact with aqueous solutions having ionic makeup distinct from connate water to reduce permeability of the formation and fluid flow therethrough, the sandstone formation being penetrated by a well bore in fluid communication therewith, the process comprising:

injecting into said subterranean sandstone formation via said well bore an aqueous solution having potassium hydroxide dissolved therein, said potassium hydroxide existing in said aqueous solution as potassium ions and hydroxide ions, said hydroxide ions interacting with said sandstone formation in the presence of said potassium ions to effectively render said fine particles relatively insensitive to said aqueous solutions having a distinct ionic makeup, and said potassium hydroxide being dissolved in said aqueous solution in a quantity sufficient to effectively render said fine particles relatively insensitive to said aqueous solutions having a distinct ionic makeup for a substantial period of time.

2. The process of claim 1 wherein said fine particles are clays.

3. The process of claim 2 where said clays comprise swelling clays and migratable clays.

4. The process of claim 3 wherein said swelling clays are selected from the group consisting of montmorillonite, swelling chlorite, vermiculite, mixed layered swelling clays and mixtures thereof.

5. The process of claim 3 wherein said migratable clays are selected from the group consisting of poorly cemented kaolinite clays, poorly cemented illite clays and mixtures thereof.

6. The process of claim 1 wherein said aqueous solution having potassium hydroxide dissolved therein is injected into said sandstone formation via said well bore at a finite flow rate.

7. The process of claim 6 wherein said finite flow rate is sufficiently high to cause said aqueous solution to advance within said sandstone formation at a rate greater than about 0.03 m/day.

8. The process of claim 1 wherein said potassium hydroxide is dissolved in said aqueous solution in a concentration of from about 5 wt.% to about 30 wt.%.

9. The process of claim 8 wherein said concentration of potassium hydroxide in said aqueous solution is inversely related to the temperature of said sandstone formation.

10. The process of claim 1 wherein said aqueous solution having potassium hydroxide dissolved therein is injected into said sandstone formation via said well bore for a period of time from about 1 hour to about 48 hours.

11. The process of claim 10 wherein said period of time is inversely related to the temperature of said sandstone formation.

12. The process of claim 1 wherein said sandstone formation is a hydrocarbon-bearing sandstone formation.

13. The process of claim 1 wherein said sandstone formation has a temperature of from about 22° C. to about 85° C. and above.

14. The process of claim 1 wherein said aqueous solution having a distinct ionic makeup is fresh water.

* * * * *

UNITED STATES PATENT AND TRADEMARK OFFICE
CERTIFICATE OF CORRECTION

PATENT NO. : 4,280,560
DATED : July 28, 1981
INVENTOR(S) : R. D. Sydansk

It is certified that error appears in the above-identified patent and that said Letters Patent are hereby corrected as shown below:

Col. 3, line 56: Delete "any" and insert --may--.
Col. 5, line 11: Delete "with" and insert --when--.
Col. 5, line 51: Delete "standstone" and insert --sandstone--.
Col. 6, line 29: Delete "temperature" and insert --temperatures--.
Col. 8, line 21: Delete "as" and insert --at--.

Signed and Sealed this

Twelfth Day of January 1982

[SEAL]

Attest:

GERALD J. MOSSINGHOFF

Attesting Officer    Commissioner of Patents and Trademarks